(12) United States Patent
Chen et al.

(10) Patent No.: US 12,332,472 B2
(45) Date of Patent: *Jun. 17, 2025

(54) OPTICAL FILM, BACKLIGHT MODULE, AND DISPLAY DEVICE

(71) Applicant: Radiant Opto-Electronics Corporation, Kaohsiung (TW)

(72) Inventors: Wei-Hsuan Chen, Kaohsiung (TW); Chung-Yung Tai, Kaohsiung (TW); Wen-Hao Cai, Kaohsiung (TW); Chun-Yi Wu, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,466

(22) Filed: Sep. 5, 2023

(65) Prior Publication Data

US 2024/0004123 A1    Jan. 4, 2024

Related U.S. Application Data

(63) Continuation of application No. 17/852,668, filed on Jun. 29, 2022, now Pat. No. 11,789,192.

(51) Int. Cl.
*F21V 8/00* (2006.01)

(52) U.S. Cl.
CPC ......... *G02B 6/0053* (2013.01); *G02B 6/0051* (2013.01)

(58) Field of Classification Search
CPC ............................ G02B 6/0053; G02B 6/0051
See application file for complete search history.

(56) References Cited

U.S. PATENT DOCUMENTS

| | | | |
|---|---|---|---|
| 2002/0018341 A1* | 2/2002 | Torihara | G02B 6/005 |
| | | | 362/601 |
| 2004/0212758 A1* | 10/2004 | Suen | G02F 1/133615 |
| | | | 349/64 |
| 2005/0041174 A1* | 2/2005 | Numata | G02B 6/0053 |
| | | | 349/61 |
| 2010/0033957 A1 | 2/2010 | Lin | |
| 2014/0321163 A1* | 10/2014 | Kao | G02B 6/0053 |
| | | | 362/619 |
| 2018/0341055 A1* | 11/2018 | Yuan | G02B 6/0053 |

FOREIGN PATENT DOCUMENTS

| | | |
|---|---|---|
| CN | 1989431 A | 6/2007 |
| CN | 102879942 A | 1/2013 |
| CN | 106773320 A | 5/2017 |
| CN | 211955885 U | 11/2020 |
| CN | 112014918 A | 12/2020 |
| CN | 112526785 A | 3/2021 |
| CN | 215867452 U | 2/2022 |
| JP | 2012252264 A | 12/2012 |

\* cited by examiner

*Primary Examiner* — Abdulmajeed Aziz
*Assistant Examiner* — Jessica M Apenteng (57) ABSTRACT

An optical film comprises a light incident side and a light emitting side opposite to the light incident side. A plurality of light incident microstructures are formed on the light incident side, and the light incident microstructures are tapered structures. According to the structural design of the light incident microstructures of the optical film, the light field of a light source can be expanded to achieve the purpose of emitting light at a specific angle. The invention also provides a backlight module and a display device including the optical film.

10 Claims, 10 Drawing Sheets

OPTICAL FILM, BACKLIGHT MODULE, AND DISPLAY DEVICE

RELATED APPLICATIONS

This application is a continuation application of U.S. application Ser. No. 17/852,668, filed on Jun. 29, 2022, which is a continuation application of International Application No. PCT/CN2021/106224, filed on Jul. 14, 2021. The entire disclosures of all the above applications are hereby incorporated by reference.

FIELD OF THE INVENTION

The present invention relates to an optical element, particularly an optical film, a backlight module, and a display device with a specific light angle.

BACKGROUND OF THE INVENTION

With the expansion field of liquid crystal displays (LCDs) application in such as mobile phones, vehicle-mounted displays, personal digital assistants (PDAs), and televisions, higher requirements are put forward for backlight technology based on light guide plates, such as: high brightness, low cost, low energy consumption, thinness, etc.

Taking the vehicle-mounted display as an example, its viewing angle needs to be extremely wide in the horizontal direction, but the conventional backlight module cannot meet the special viewing angle requirements of the vehicle-mounted display.

SUMMARY OF THE INVENTION

One object of the present invention is to provide an optical film that expands the light field and can generate a specific light angle.

The optical film comprises a light incident side and a light emitting side opposite to the light incident side. A plurality of light incident microstructures are formed on the light incident side, and each of the light incident microstructures is a tapered structure, wherein the extension direction of the optical film is defined as a first axis and a second axis perpendicular to the first axis, and the cross-sectional shape of each of the light incident microstructure in the first axis is different from the cross-sectional shape in the second axis.

In a preferable embodiment, each of the light incident microstructures has a plurality of side surfaces, a vertex, and a central line, the central line is perpendicular to the light incident side of the optical film, and the vertex is located on the central line, wherein the side surfaces are connected at the vertex as a joint point and each edge of anyone side surface is joined to the edge of the adjacent side surface to form a composite surface.

In a preferable embodiment, a plurality of light emitting microstructures are formed on the light emitting side of the optical film, and the light emitting microstructures are protruding structures.

In a preferable embodiment, the optical film comprises a base layer, a structure layer disposed on one side of the base layer, and a diffusing particle layer disposed on the other side of the base layer, and the light incident microstructures are formed on the structural layer.

In a preferable embodiment, each of the light incident microstructures has a first optical surface and a second optical surface with the different slope and asymmetrical arrangement in the direction of the first axis, a third optical surface and a fourth optical surface with the same slope and symmetrical arrangement in the direction of the second axis.

Another object of the present invention is to provide a backlight module.

The backlight module comprises at least one optical film and a backlight unit. The backlight unit is disposed on the light incident side of the at least one optical film and includes a light source.

In a preferable embodiment, the backlight module further includes a grating layer on the light emitting side of the optical film, the grating layer has a plurality of baffles and a plurality of light transmitting parts located between adjacent baffles, and the baffles are spaced and inclined along the direction of the first axis and extend along the direction of the second axis.

In a preferable embodiment, the backlight unit further includes a diffusing plate for receiving the light from the light source, the light source has a circuit board and a plurality of light emitting diodes disposed on the circuit board, the diffusing plate has a bottom surface and a light emitting surface opposite to the bottom surface, the bottom surface faces the circuit board, and the light emitting surface faces the optical film.

In a preferable embodiment, the backlight unit further includes a light guide plate for receiving the light from the light source, the light source has a circuit board and a plurality of light emitting diodes disposed on the circuit board, the light guide plate has a side surface and a light emitting surface connected to the side surface, the side surface faces the circuit board, and the light emitting surface faces the optical film.

In a preferable embodiment, the light source has a circuit board, a plurality of light emitting diodes disposed on the circuit board, and a light transmitting adhesive layer covering the light emitting diodes, the light emitting diodes emit blue light, the backlight unit further includes a fluorescent film and a diffusing plate or diffuser for receiving the light from the light source, and the fluorescent film is used to cooperate with the light emitting diodes to convert blue light into white light.

Another object of the present invention is to provide a display device.

The display device includes the backlight module as described above, and a display panel arranged on the backlight module.

According to the structural design of the light incident microstructures of the optical film, the light field of the light source can be expanded to achieve the purpose of emitting light at a specific angle.

DETAILED DESCRIPTION OF THE INVENTION

The detailed description and preferred embodiments of the invention will be set forth in the following content and provided for people skilled in the art to understand the characteristics of the invention.

Figure 1:
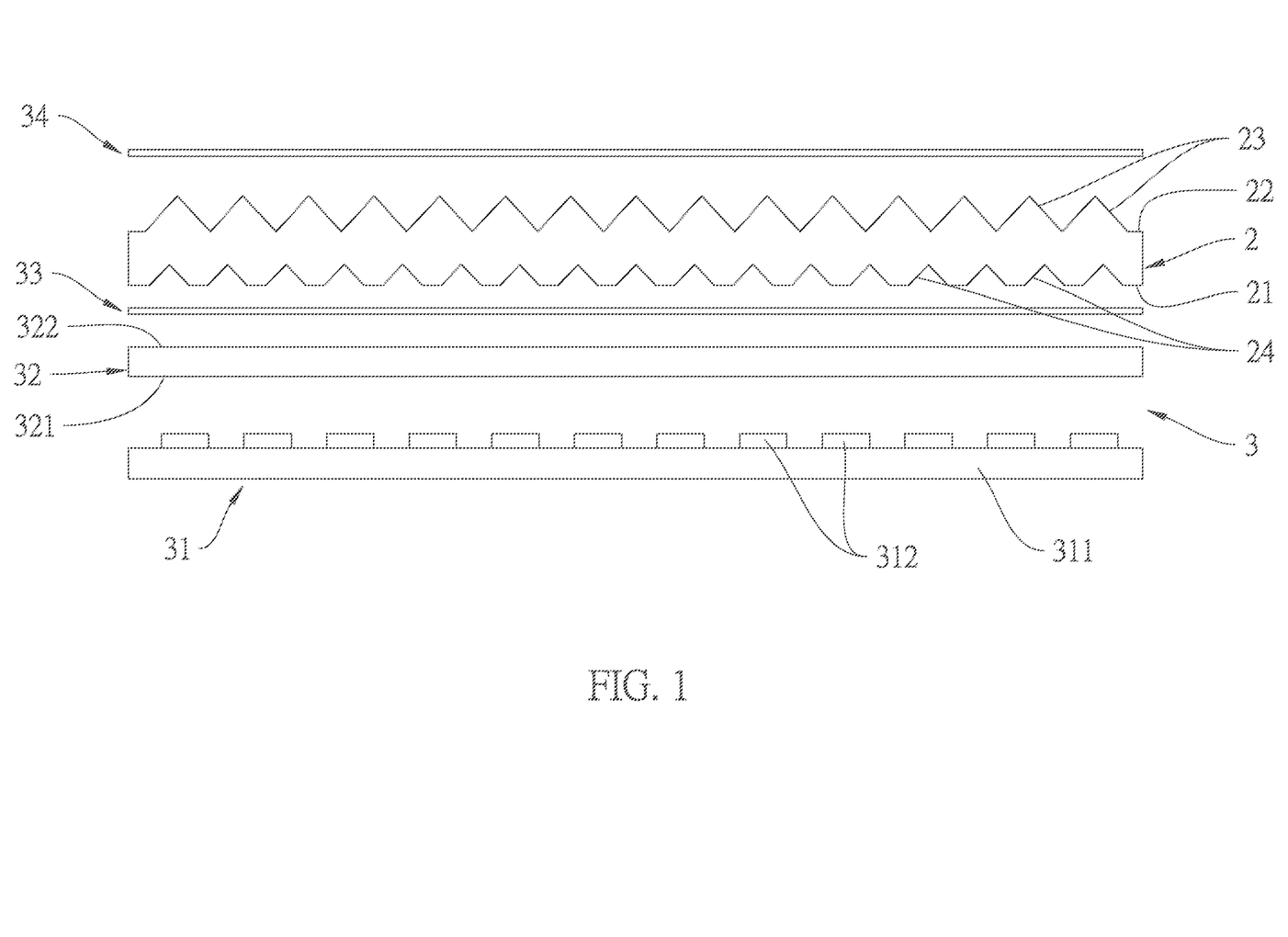
FIG. 1 is a schematic diagram illustrating a first preferred embodiment of the backlight module of this present invention, wherein a light source is a direct-lit light source.
Figure 2:
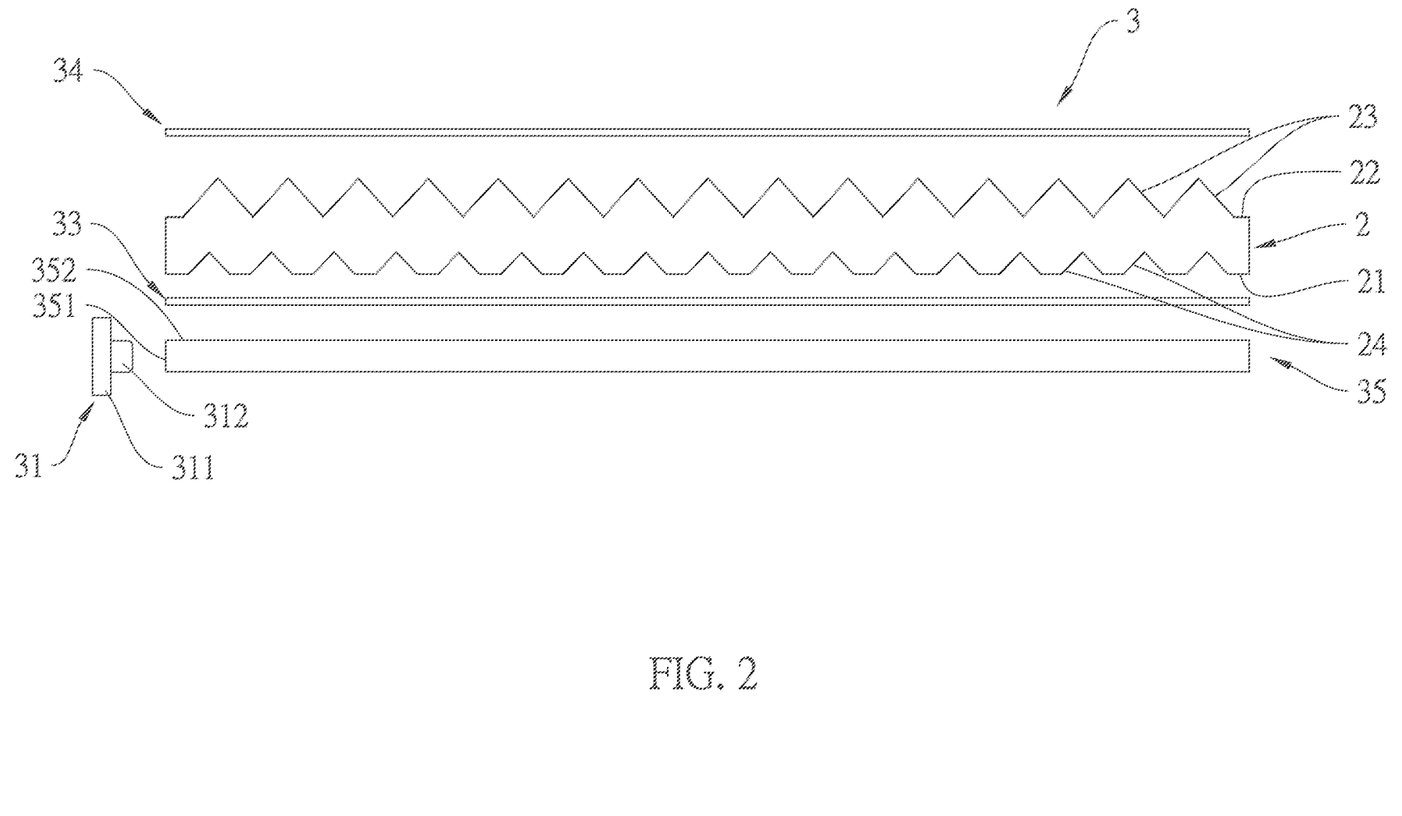
FIG. 2 is a schematic diagram illustrating another form of the first preferred embodiment, wherein the light source is a side-lit light source.
Figure 3:
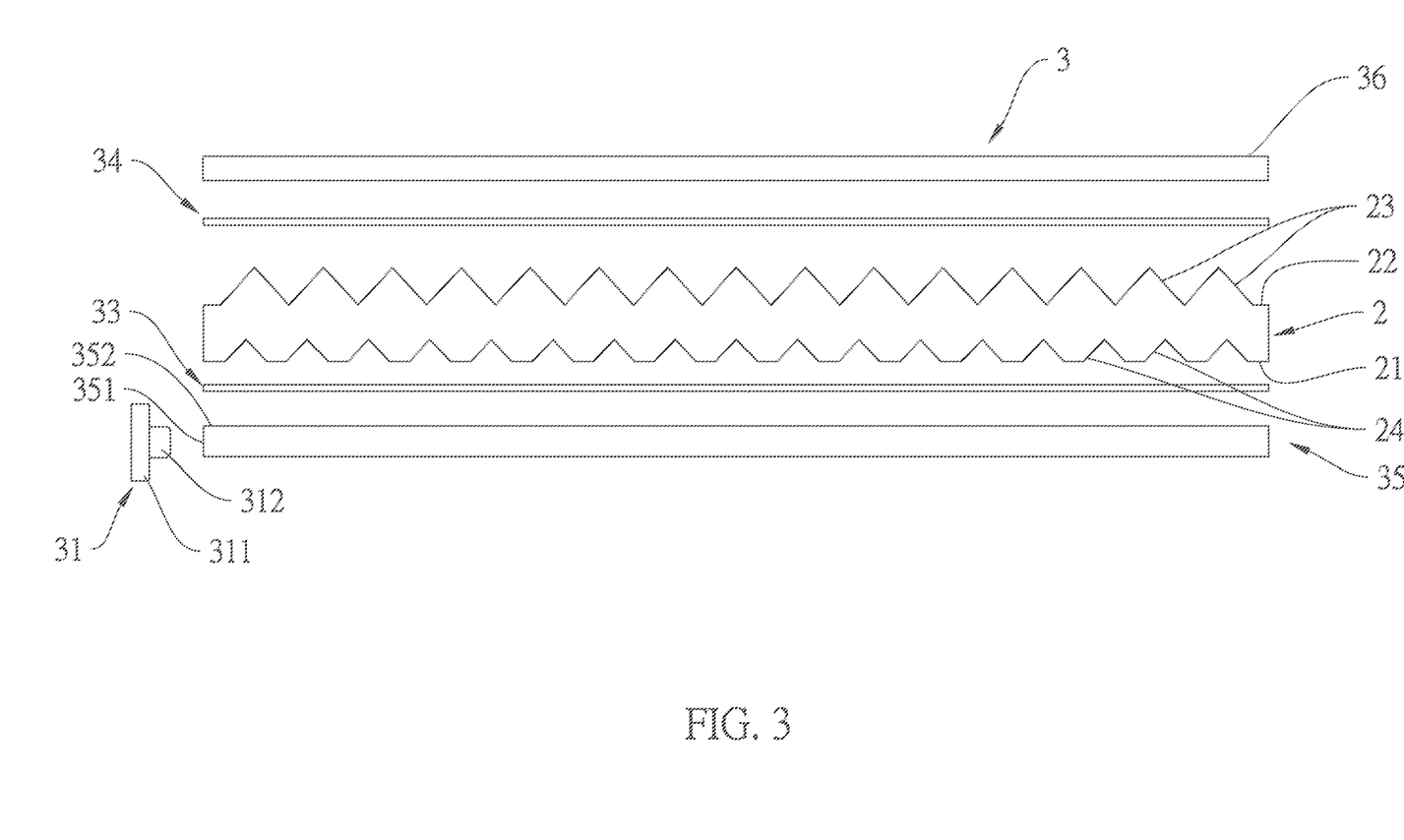
FIG. 3 is a schematic diagram of a preferred embodiment of the display device of the present invention.

Referring to FIG. 1, it is the first preferred embodiment of the backlight module of the present invention. The backlight module comprises an optical film 2 and a backlight unit 3. In some embodiments, the backlight unit 3 includes a direct-lit light source 31, a diffusing plate 32 for receiving the light from the light source 31, a diffuser 33 stacked on the diffusing plate 32, and a brightness enhancement film 34 located on a light emitting side of the diffuser 33. The light source 31 has a circuit board 311 and a plurality of light emitting diodes 312 disposed on the circuit board 311. The diffusing plate 32 has a bottom surface 321 and a light emitting surface 322 opposite to the bottom surface 321. The bottom surface 321 faces the circuit board 311, and the light emitting surface 322 faces the diffusion sheet 32. Referring to FIG. 2, in another embodiment, the backlight unit 3 includes a side-lit light source 31, a light guide plate 35 for receiving the light from the light source 31, a diffuser 33 stacked on the light guide plate 35, and a brightness enhancement film 34 located on the light emitting side of the diffuser 33. The light guide plate 35 has a light incident surface 351 facing the circuit board 311 and a light emitting surface 352 connected to the light incident surface 351. The light emitting surface 352 faces the diffuser 33. As shown in FIG. 3, a display panel 36 is disposed on a light emitting side of the brightness enhancement film 34 to form a display device. It should be noted that, in order to clearly show the structure of each element, each element is separated from each other. In actual use, the elements are closely stacked. The following embodiments are also the stacked structures.

Referring to FIG. 1 and FIG. 2, in this embodiment, the optical film 2 is disposed between the diffuser 33 and the brightness enhancement film 34 and is a prism with microstructures formed on both sides. More specifically, the optical film 2 has a light incident side 21 and a light emitting side 22 opposite to the light incident side 21. The light incident side 21 faces the diffuser 33, and the light emitting side 22 faces the brightness enhancement film 34. The light emitting side 22 is formed with a plurality of light emitting microstructures 23, and the light emitting microstructures 23 are protruding structures. A plurality of light incident microstructures 24 are formed on the light incident side 21, wherein the light incident microstructures 24 are tapered structures. It should be noted that, the light field of the light source 31 can be further expanded no matter the tapered structure of each of the light incident microstructures 24 is concave or convex. In this embodiment, the concave-shaped design of the tapered structure can avoid scratching the diffuser 33 stacked below.

Figure 4:
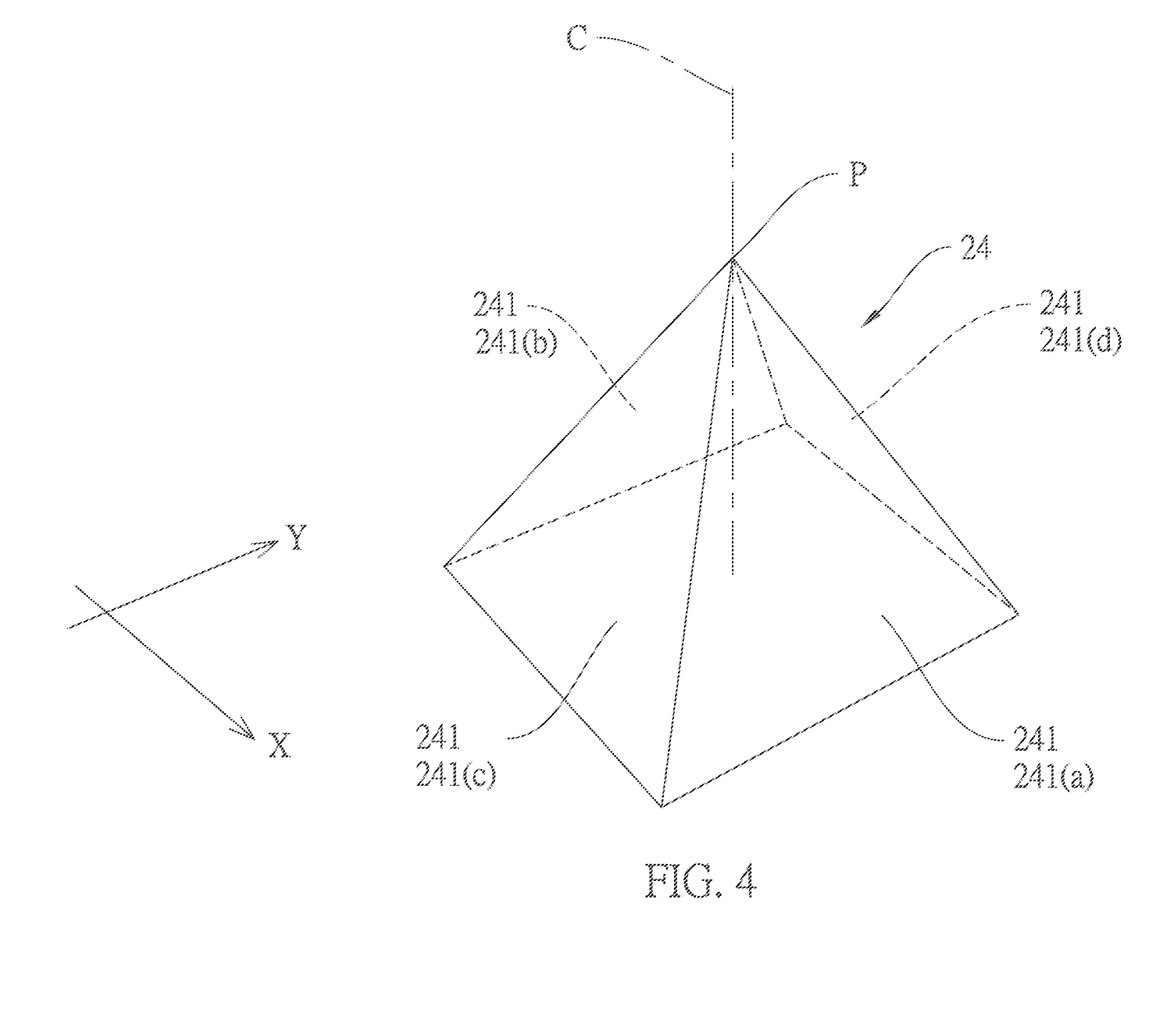
FIG. 4 is a schematic diagram illustrating an incident light microstructure as a symmetrical pyramid structure.

As shown in FIG. 4, each of the light incident microstructures 24 is a tapered structure with quadrangular shape and has four side surfaces 241, a vertex P and a central line C. The central line C is perpendicular to the light incident side 21 of the optical film 2, and the vertex P is located on the central line C. The side surfaces 241 are connected at the vertex P as a joint point and each edge of anyone side surface 241 is joined to the edge of the adjacent side surface 241 to form a composite surface. In more detail, the optical film 2 is defined as an X-axis and a Y-axis perpendicular to the X-axis. Each of the light incident microstructures 24 has a first optical surface 241*a* and a second optical surface 241*b* with the same slope and symmetrical arrangement in the direction of the X-axis, and a third optical surface 241*c* and a fourth optical surface 241*d* with the same slope and symmetrical arrangement in the direction of the Y-axis. Therefore, each of the light incident microstructures 24 is a symmetrical pyramid shape.

Figure 5:
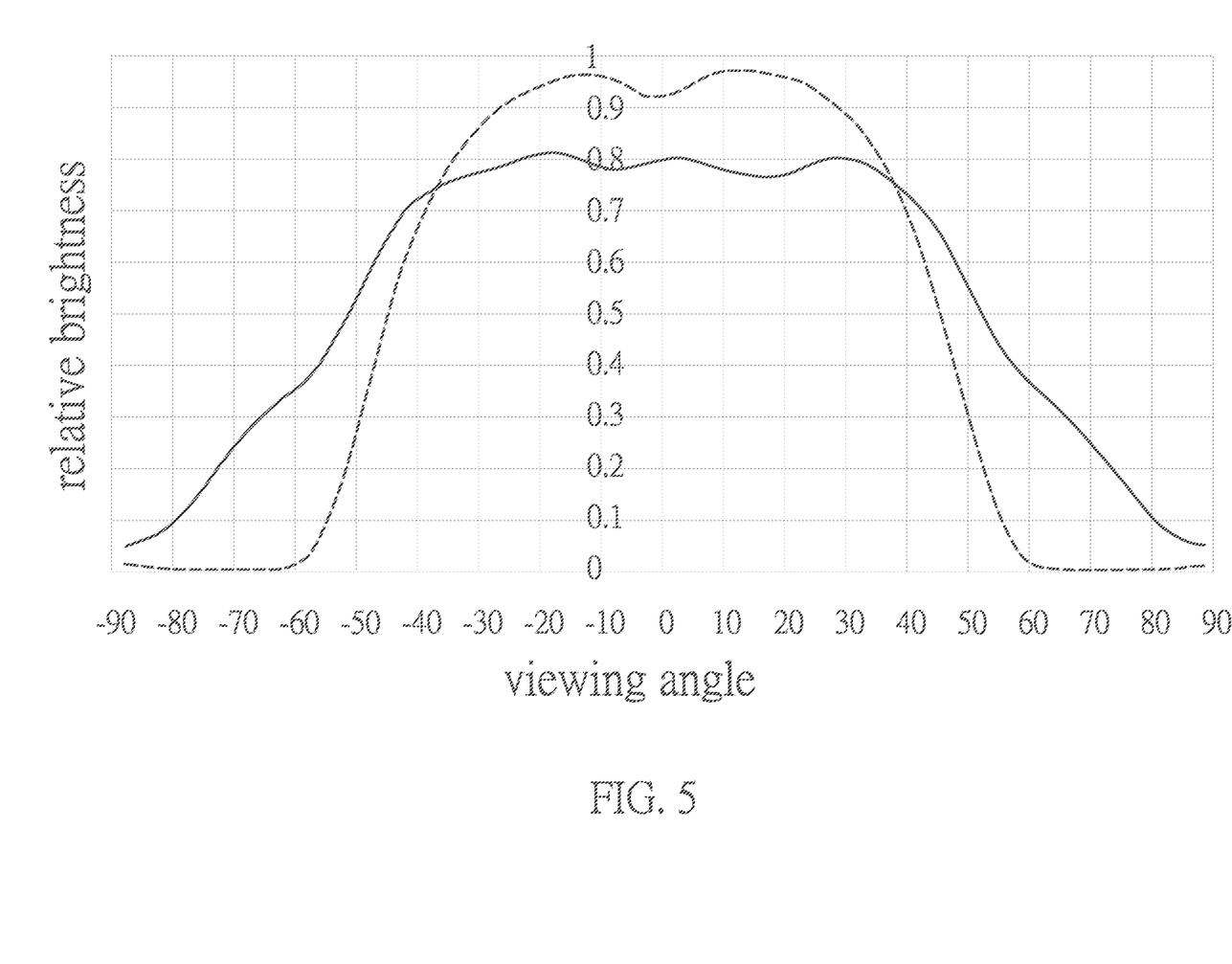
FIG. 5 is a curve diagram illustrating an optical film of this present invention which can reduce the brightness of the middle viewing angle and simultaneously increase the brightness of the large viewing angles on both sides.

Since each of the light incident microstructure 24 is a tapered structure with multiple sides, when the light of the light emitting diodes 312 enter the light incident microstructures 24 of the optical film 2, the light can be refracted outward through the multiple sides of each of the light incident microstructures 24 to produce a light splitting effect, no matter in the direction of the X axis or the Y axis. Therefore, the directional light of the light emitting diodes 312 can be homogenized. As shown in FIG. 5, compared with the conventional backlight module (shown by the dotted line), the optical film 2 of this embodiment (shown by the solid line) can slightly reduce the brightness of the middle viewing angle (that is, the area between the solid line and the dashed line between −40 degrees and +40 degrees is smaller). At the same time, the optical film 2 can greatly improve the brightness of the large viewing angle on both sides (that is, the area between the solid line and the dotted line out of the range from −40 degrees to +40 degrees is larger). Therefore, the distribution of the light field becomes wider, and it is also suitable for in-vehicle equipment, which meets the special wide viewing angle that is often required by in-vehicle models for the purpose of allowing the persons at the driver's seat and the passenger seat to watch at the same time.

Figure 6:
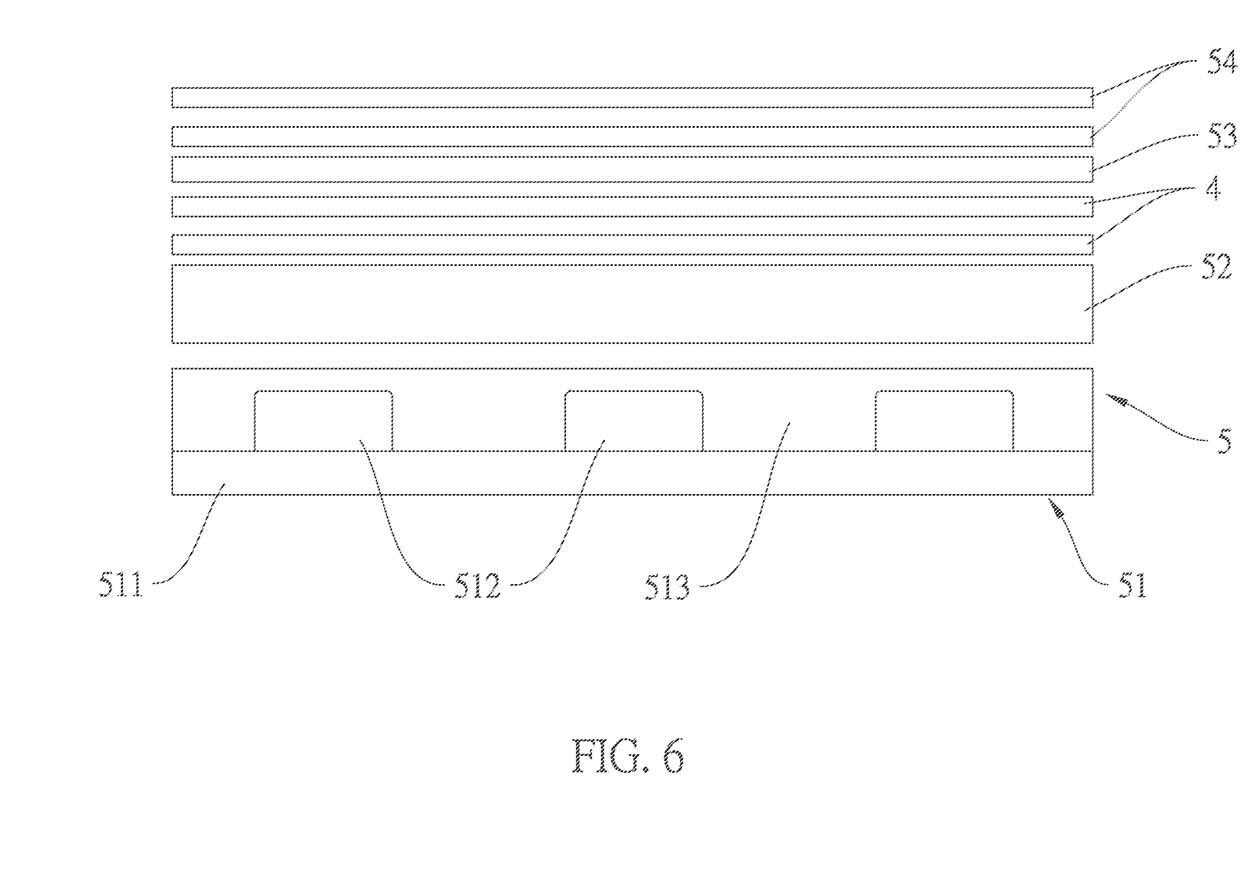
FIG. 6 is a schematic diagram illustrating a second preferred embodiment of the backlight module of this present invention.

Referring to FIG. 6, it is a second preferred embodiment of the backlight module of the present invention. The backlight module comprises at least one optical film 4 and a backlight unit 5. The backlight unit 5 includes a light source 51, a diffusing plate 52 for receiving the light from the light source 51, a fluorescent film 53 on a light emitting side of the diffusing plate 52, and a plurality of brightness enhancement films 54 located on a light emitting side of the fluorescent film 53. In this embodiment, two optical films 4 are stacked between the diffusion plate 52 and the fluorescent film 53. The light source 51 is a direct-lit light source and comprises a circuit board 511, a plurality of light emitting diodes 512 disposed on the circuit board 511, and a light transmitting adhesive layer 513 covering the light emitting diodes 512. The light emitting diodes 512 emit blue light, and the fluorescent film 53 is used to convert blue light into white light.

Figure 7:
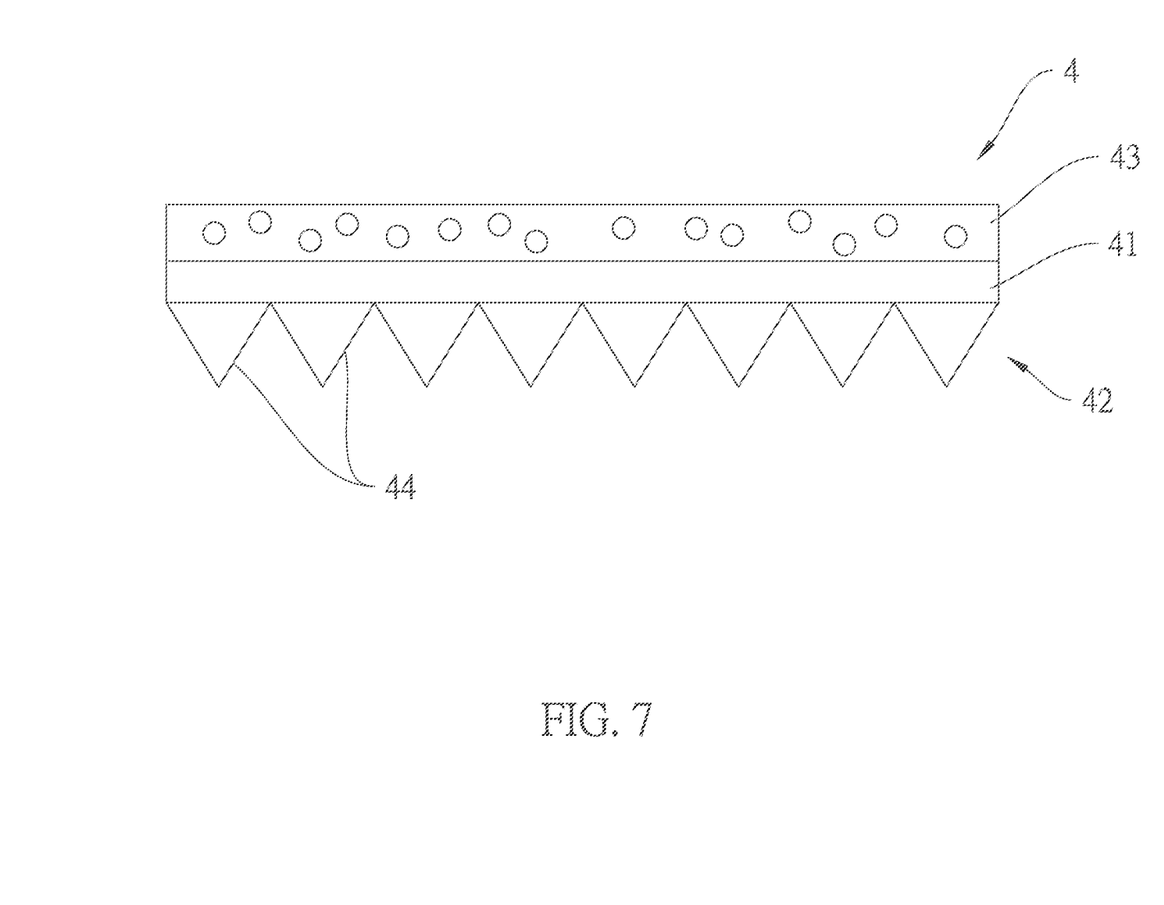
FIG. 7 is a schematic diagram illustrating the structure of the optical film of the second preferred embodiment.

Referring to FIG. 7, each of the optical films 4 includes a base layer 41, a structural layer 42 disposed on one side of the base layer 41, and a diffusing particle layer 43 disposed on the other side of the base layer 41. A plurality of light incident microstructures 44 are formed on the side of the structure layer 42 facing the diffusing plate 52. Each of the light incident microstructure 44 is a tapered structure. In this embodiment, the tapered structure is a convex structure and is a symmetrical pyramid shape, which is the same as the first preferred embodiment, and the light field of the light source 51 can be further expanded in the same way.

Referring to FIG. 6 and FIG. 7, in this embodiment, the optical film 4 can achieve the effect of expanding the light field of the light source 51 through the design of the light incident microstructure 44. Therefore, it can meet the needs of the special wide viewing angle of the vehicle model for the purpose of allowing the persons at the driver's seat and the passenger seat to watch at the same time. By allowing light to pass through the structural layer 42, the base layer 41 and the diffusing particle layer 43, the optical film 4 can produce a better uniform light effect. It can further homogenize the bright spot areas directly above the light emitting diodes 512 and reduce the dark shadow areas between the light emitting diodes 512 to reduce the phenomenon of hot spots. And in this embodiment, two layers of the optical film 4 are stacked, which has a multiplication effect of homogenizing the bright spot areas and reducing the dark shadow areas. Since the optical film 4 can greatly improve the uniformity of light, the required light mixing distance between the light source 51 and the diffusion plate 52 can be shortened, which is beneficial to the thinning of the overall structure. At the same time, the filling material (such as Polycarbonate, PC) used to support the diffusing plate 52 and other optical films on the light transmitting adhesive layer 513 in the prior art is eliminated. Thereby, the material cost and the stacking thickness of the filling material are reduced, and the overall structure can be further thinned.

Figure 8:
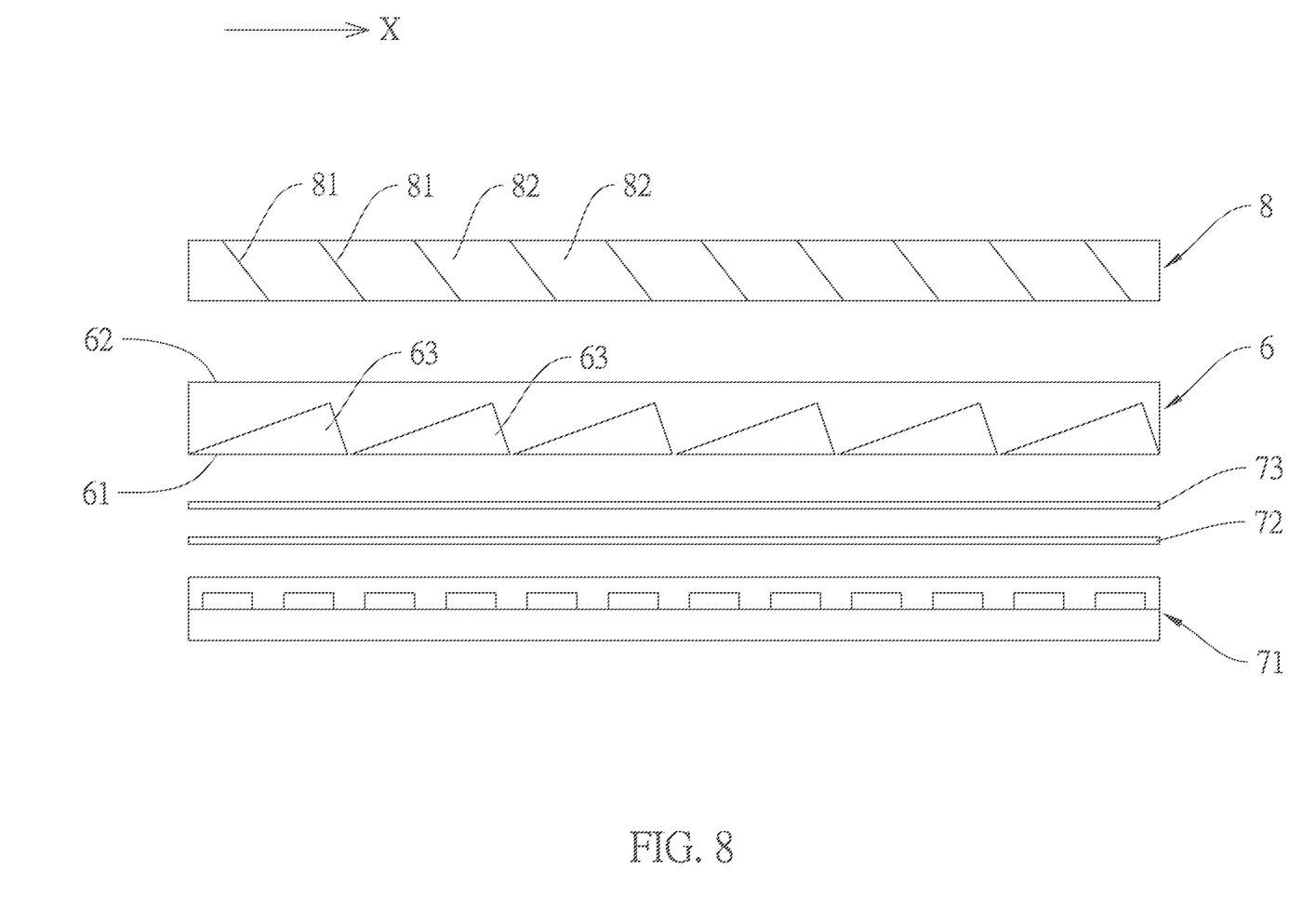
FIG. 8 is a schematic diagram illustrating a third preferred embodiment of the backlight module of this present invention.

Referring to FIG. 8, it is a third preferred embodiment of the backlight module of the present invention. The backlight module comprises an optical film 6, a backlight unit 7, and a grating layer 8. The backlight unit 7 includes a light source 71, a diffusing plate 72 for receiving the light from the light source 71, and a fluorescent film 73 on a light emitting side of the diffusing plate 72. The optical film 6 is disposed between the fluorescent film 73 and the grating layer 8. The fluorescent film 73 is also used to convert blue light into white light.

Figure 9:
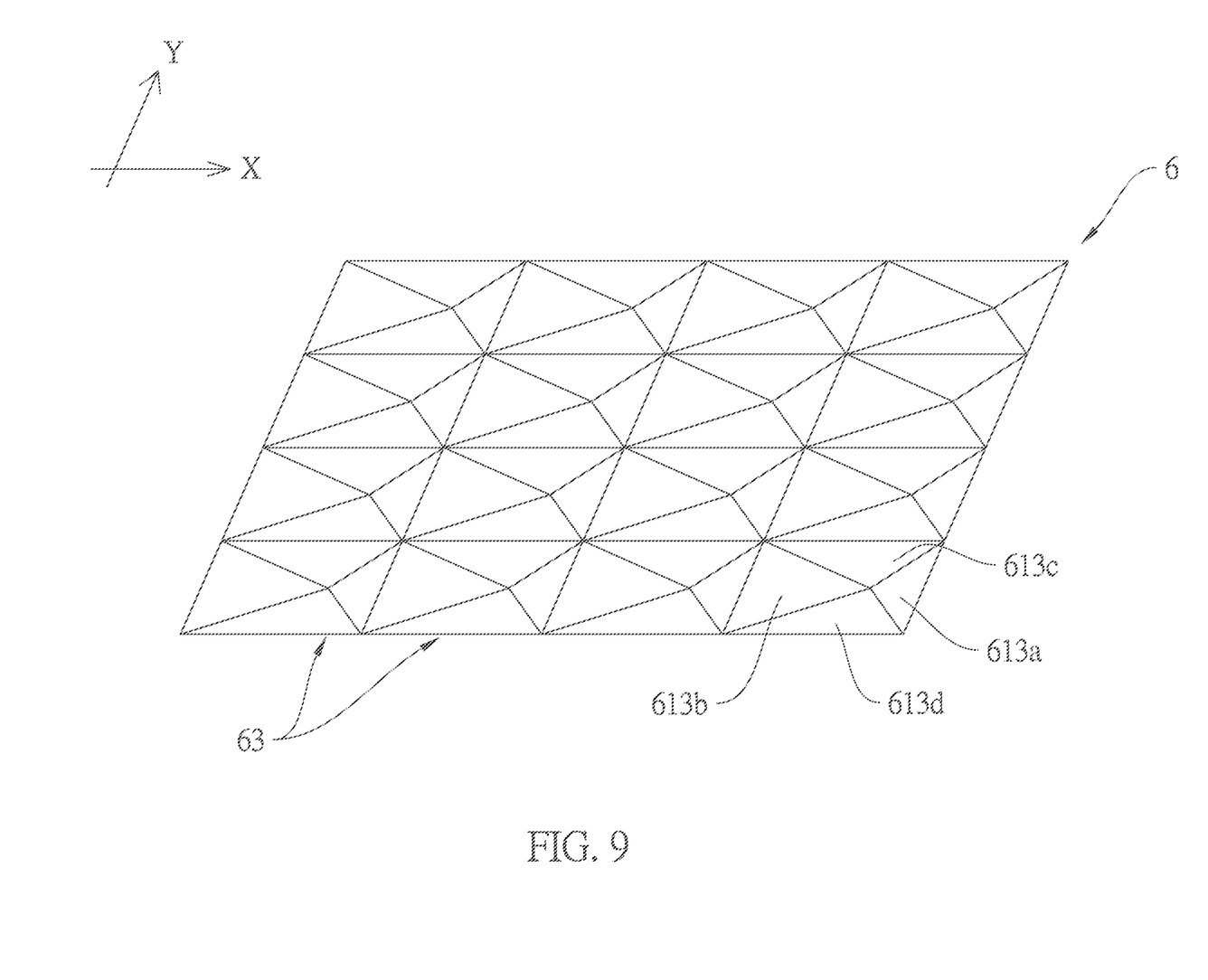
FIG. 9 is a schematic diagram illustrating the structure of the optical film of the third preferred embodiment.

The optical film 6 has a light incident side 61 and a light emitting side 62 opposite to the light incident side 61. The light incident side 61 faces the fluorescent film 73, and the light emitting side 62 faces the grating layer 8. A plurality of light incident microstructures 63 are formed on the light incident side 61, and each of the light incident microstructures 63 is a tapered structure. In this embodiment, the tapered structure can be designed as the concave-shaped to avoid scratching the fluorescent film 73 stacked below. In more detail, as shown in FIG. 9, the optical film 6 is defined as an X-axis and a Y-axis perpendicular to the X-axis. Each of the light incident microstructure 63 has a first optical surface 631a and a second optical surface 631b with different slopes and asymmetrically arrangement in the direction of the X-axis, and a third optical surface 631c and a fourth optical surface 631d with the same slope and symmetrically arranged in the direction of the Y-axis. Therefore, each of the light incident microstructures 63 is an asymmetric pyramid shape. In FIG. 9, the light incident microstructures 63 are arranged continuously, and in some embodiments, they may also be arranged discontinuously. In addition, the adjacent light incident microstructures 63 are connected by planes to avoid scratching the fluorescent film 73 stacked below.

As shown in FIG. 8, the grating layer 8 has a plurality of baffles 81 and a plurality of light transmitting parts 82 located between adjacent baffles 81. The baffles 81 are spaced and inclined along the direction of the X-axis and extend along the direction of the Y-axis.

Figure 10:
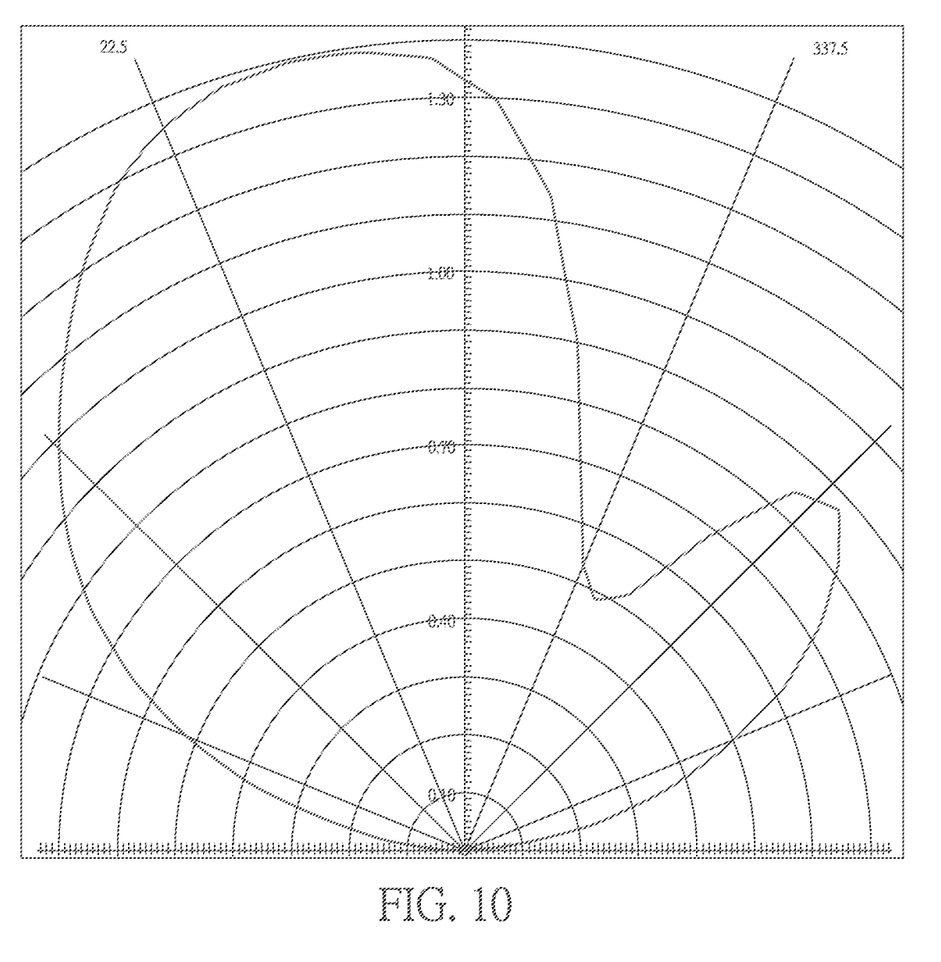
FIG. 10 is a schematic diagram illustrating the simulation of the light exit angle of the third preferred embodiment.

When the light passes through the optical film 6, the light incident microstructures 63 can produce a light splitting effect, and the asymmetric pyramid-shaped design can also deflect the light to a specific direction. In addition, with the setting of the grating layer 8, light will be emitted from the light transmitting parts 82 of the grating layer 8. Therefore, as long as the inclination angle of the baffles 81 are adjusted, the light emitting direction after passing through the grating layer 8 can be changed, thereby adjusting the distribution of the light field. As shown in FIG. 10, the emitting direction of the light can be deflected to one side with the design of the backlight module of this preferred embodiment.

Taking the vehicle dashboard as an example, due to the large amount of information that needs to be displayed on the dashboard, its display area is usually a horizontally extending rectangle rather than a square. Therefore, this embodiment uses the design of the optical film 6 and the grating layer 8 to deflect the light to a specific direction, for example, to provide driving information in the direction of the driver's seat, so as to meet the asymmetric viewing angle requirements of the vehicle display device. At the same time, the slope of the optical surfaces 631a to 631d and the inclination direction and angle of the baffles 81 of the grating layer 8 can be adjusted according to the different use situations to meet the requirements of various special viewing angles.

In this invention, each of the light incident microstructures of the optical film is a symmetrical or asymmetrical pyramid-shaped structure, so the light can be refracted outward in both the X-axis and Y-axis directions to produce a light splitting effect when the light passes through the light incident microstructures. Therefore, the directional light sources are homogenized, so it can meet the special wide viewing angle requirements of the vehicle model for the purpose of being able to be viewed from the driver's seat and the passenger seat at the same time. The asymmetric pyramid shape of the light incident microstructures can deflect light to a specific direction, such as providing driving information towards to the driver's seat to meet the needs of special viewing angles.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical film, comprising a light incident side and a light emitting side opposite to the light incident side, wherein a plurality of light incident microstructures are formed on the light incident side and dispersed on one plane, and each of the light incident microstructures is a tapered structure, wherein the extension direction of the optical film is defined as a first axis and a second axis perpendicular to the first axis, the cross-sectional shape of each of the light incident microstructure in the first axis is different from the cross-sectional shape in the second axis, and each of the light incident microstructures has a first optical surface and a second optical surface with the different slope and asymmetrical arrangement in the direction of the first axis as well as has a third optical surface and a fourth optical surface with the same slope and symmetrical arrangement in the direction of the second axis, thereby a brightness distribution emitted from the light emitting side of the optical film is non-symmetrical and deflects light to a specific direction with higher brightness as long as suppresses light to another different direction with lower brightness.

2. The optical film as claimed in claim 1, wherein each of the light incident microstructures has a plurality of side surfaces, a vertex, and a central line, the central line is perpendicular to the light incident side of the optical film, and the vertex is located on the central line, wherein the side surfaces are connected at the vertex as a joint point and each edge of anyone side surface is joined to the edge of the adjacent side surface to form a composite surface.

3. The optical film as claimed in claim 1, wherein a plurality of light emitting microstructures are formed on the light emitting side of the optical film, and the light emitting microstructures are protruding structures.

4. The optical film as claimed in claim 1, wherein the optical film comprises a base layer, a structure layer disposed on one side of the base layer, and a diffusing particle layer disposed on the other side of the base layer, and the light incident microstructures are formed on the structural layer.

5. A backlight module, comprising at least one optical film as claimed in claim 1, and a backlight unit, wherein the backlight unit is disposed on the light incident side of the at least one optical film and includes a light source.

6. The backlight module as claimed in claim 5, wherein the backlight module further includes a grating layer on the light emitting side of the optical film, the grating layer has a plurality of baffles and a plurality of light transmitting parts located between adjacent baffles, and the baffles are spaced and inclined along the direction of the first axis and extend along the direction of the second axis.

7. The backlight module m as claimed in claim 5, wherein the backlight unit further includes a diffusing plate for receiving the light from the light source, the light source has a circuit board and a plurality of light emitting diodes disposed on the circuit board, the diffusing plate has a bottom surface and a light emitting surface opposite to the bottom surface, the bottom surface faces the circuit board, and the light emitting surface faces the optical film.

8. The backlight module as claimed in claim 5, wherein the backlight unit further includes a light guide plate for receiving the light from the light source, the light source has a circuit board and a plurality of light emitting diodes disposed on the circuit board, the light guide plate has a side surface and a light emitting surface connected to the side surface, the side surface faces the circuit board, and the light emitting surface faces the optical film.

9. The backlight module as claimed in claim 5, wherein the light source has a circuit board, a plurality of light emitting diodes disposed on the circuit board, and a light transmitting adhesive layer covering the light emitting diodes, the light emitting diodes emit blue light, the backlight unit further includes a fluorescent film and a diffusing plate or diffuser for receiving the light from the light source, and the fluorescent film is used to cooperate with the light emitting diodes to convert blue light into white light.

10. A display device, comprising the backlight module as described in claim 5, and a display panel arranged on the backlight module.

* * * * *